(12) United States Patent
Lorthoir

(10) Patent No.: US 8,109,207 B2
(45) Date of Patent: Feb. 7, 2012

(54) GRIPPING MEMBER FOR A MAGNETISED LID

(75) Inventor: Christophe Lorthoir, Bloye (FR)

(73) Assignee: SEB SA, Ecully (FR)

( * ) Notice: Subject to any disclaimer, the term of this patent is extended or adjusted under 35 U.S.C. 154(b) by 629 days.

(21) Appl. No.: 12/094,461

(22) PCT Filed: Nov. 22, 2006

(86) PCT No.: PCT/FR2006/002568
§ 371 (c)(1),
(2), (4) Date: Jun. 10, 2008

(87) PCT Pub. No.: WO2007/060326
PCT Pub. Date: May 31, 2007

(65) Prior Publication Data
US 2008/0282506 A1 Nov. 20, 2008

(30) Foreign Application Priority Data
Nov. 23, 2005 (FR) .................................... 05 11873

(51) Int. Cl.
*A23P 1/00* (2006.01)
*A47J 45/07* (2006.01)
(52) U.S. Cl. ............. 99/432; 16/425; 16/422; 294/65.5; 335/285

(58) Field of Classification Search .................... 99/432; 16/425, 422, DIG. 12; 292/251.3; 22/212.5, 22/759; 294/65.5; 335/285; 211/303
See application file for complete search history.

(56) References Cited

U.S. PATENT DOCUMENTS
2,731,663 A 1/1956 Thompson

FOREIGN PATENT DOCUMENTS

| GB | 937397 | * | 9/1963 |
|---|---|---|---|
| GB | 937397 A | | 9/1963 |
| GB | 2211356 | * | 6/1989 |
| GB | 2211356 A | | 6/1989 |
| JP | 48003866 U | | 1/1973 |
| JP | 0365523 U | | 6/1991 |
| JP | 2003203810 A | | 7/2003 |
| WO | 03/019583 A | | 3/2003 |
| WO | WO-03/019583 | * | 3/2003 |

* cited by examiner

*Primary Examiner* — Shawntina Fuqua
(74) *Attorney, Agent, or Firm* — Bachman & Lapointe, P.C.

(57) ABSTRACT

A gripper for a removable lid of a kitchen utensil is provided, which can be fixed to a top of a lid through the action of a magnet on a magnetic component. The gripper comprises a base plate and an operating member that can move relative to the base plate between a magnetizing position in which the force exerted by the magnet on the magnetic component allows the gripper to be secured to the top, and an isolating position in which this force is not strong enough to secure the gripper to the top.

6 Claims, 2 Drawing Sheets

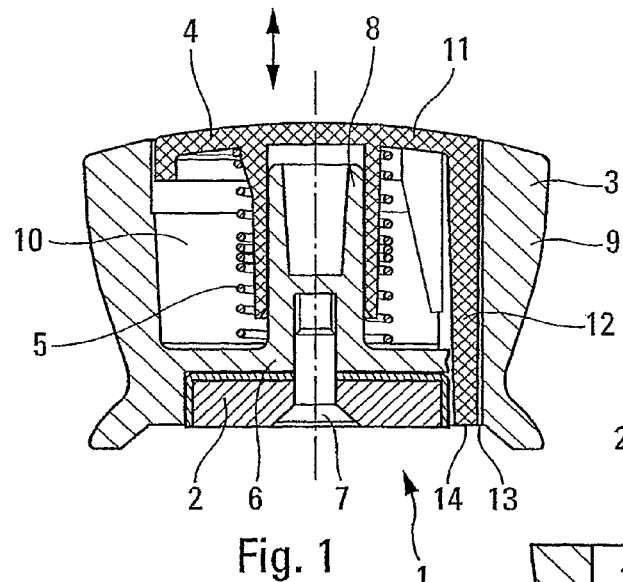
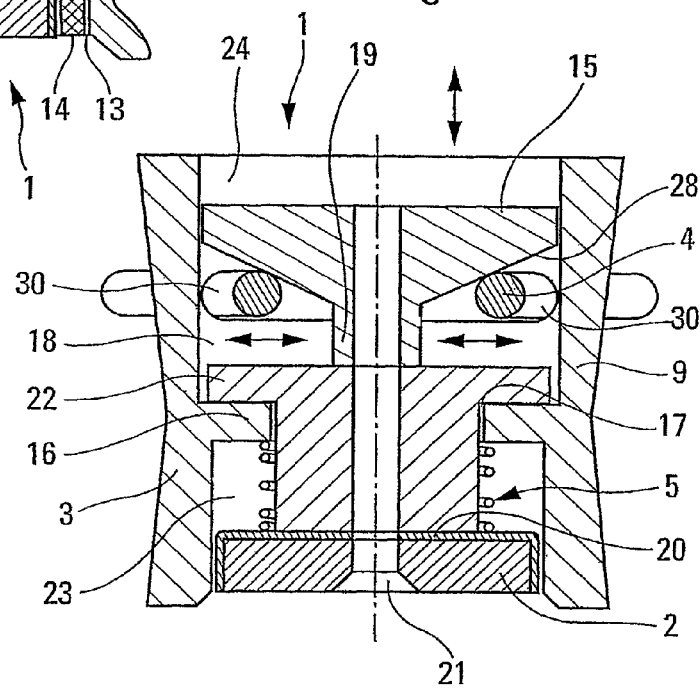
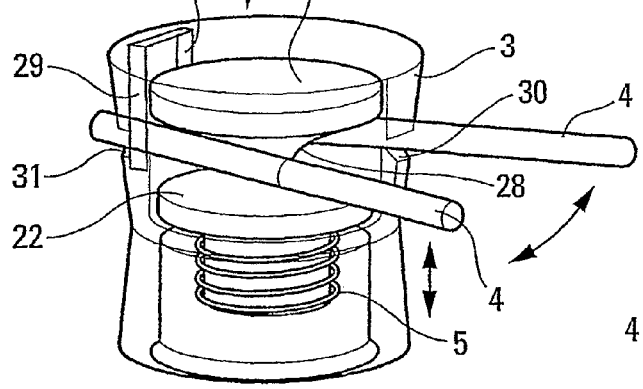
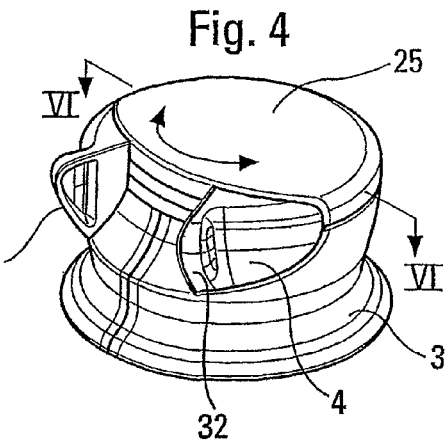
Fig. 1
Fig. 2
Fig. 3
Fig. 4

GRIPPING MEMBER FOR A MAGNETISED LID

BACKGROUND (1) Field of the Invention

The present invention concerns a gripping member for a magnetised lid for a kitchen utensil, for example for a saucepan.

(2) Prior Art

A lid is known of the type comprising a cover adapted to cover the culinary article and a removable gripping member fixed to the cover by the action of a magnet on a magnetisable piece.

However, determining the power of the magnet is problematic: if it is too weak, the cover may not be properly secured to the gripping member and, if it is too great, it may be difficult for the user to remove the cover from the gripping member. To this drawback is added the fact that, whatever the power of the magnet, in order to be able to remove the gripping member, the user must exert a traction force on the gripping member and a pressing force on the cover, which limits this manipulation when the lid is hot.

SUMMARY OF THE INVENTION

The present invention aims to mitigate the aforementioned drawbacks.

According to the invention, the gripping member of the lid of the aforementioned type comprises a base and a manoeuvring member able to move with respect to the base between a magnetisation position in which the force exerted by the magnet on the magnetisable piece makes it possible to secure the gripping member to the cover, and an isolation position in which this force is insufficient to allow the securing of the gripping member to the cover.

BRIEF DESCRIPTION OF THE DRAWINGS

Other particularities and advantages will emerge in the description of the four embodiments given by way of non-limitative examples and illustrated by the drawings, in which:

FIG. 1 is a sectional view of a gripping member according to a first embodiment, FIG. 2 is a sectional view of a gripping member according to a second embodiment, FIG. 3 is a cutaway perspective of the gripping member according to the second embodiment, FIG. 4 is a perspective view of a gripping member according to a third embodiment.

DETAILED DESCRIPTION OF THE PREFERRED EMBODIMENTS

Figure 5:
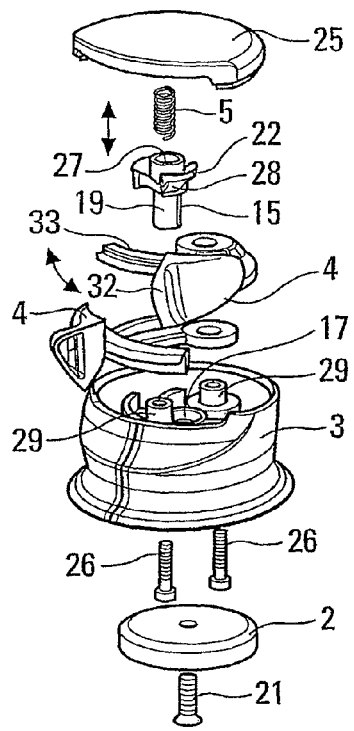
FIG. 5 is an exploded perspective view of the gripping member according to the third embodiment.
Figure 6:
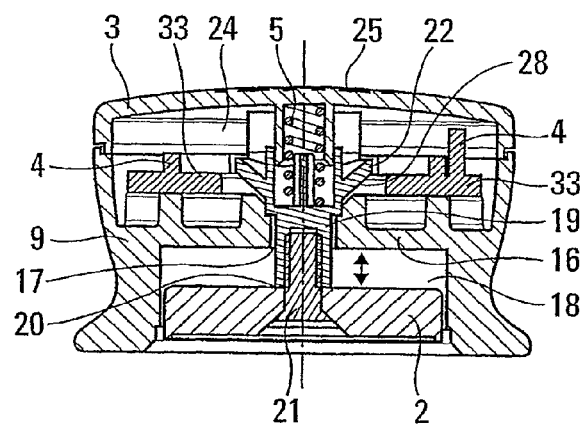
FIG. 6 is a sectional view of the gripping member according to the second embodiment along the line VI-VI in FIG. 4.

A lid for a culinary utensil typically comprises firstly a cover that is adapted to cover the culinary utensil and secondly a gripping member 1 that is adapted to facilitate the gripping of the lid by a user. In addition, in the four embodiments, the lid comprises firstly a magnet 2 that is carried by the gripping member 1 and secondly a magnetisable piece that is carried by the cover, thus enabling the gripping member 1 to be removably fixed to the cover by the action of the magnet 2 on the magnetisable piece.

In addition, the gripping member 1 comprises a base 3 and a manoeuvring member 4. The base 3 forms the body of the gripping member 1 and enables the user to grip the latter (as well as the cover when it is secured to it). The manoeuvring member 4 is movable with respect to the base 3 and enables the user to remove the gripping member 1 from the cover. The manoeuvring member 4 is able to move between a magnetisation position in which the force exerted by the magnet 2 on the magnetisable piece enables the gripping member 1 to be secured to the cover, and an isolation position in which this force is insufficient to allow the securing of the gripping member 1 to the cover (and therefore permits the separation of these two parts).

In addition, in the first three embodiments, the gripping member 1 comprises a return member 5 (in this case a spring 5) urging the manoeuvring member 4 into its magnetisation position. Because of this, in the four embodiments, the user must drive the manoeuvring member 4 from its magnetisation position to its release position and, in the fourth embodiment, he must also drive the manoeuvring member 4 from its release position to its magnetisation position.

As can be seen in FIG. 1, in the first embodiment, the magnet 2 is carried by the base 3.

The base 3 comprises a bottom wall 6 that faces the cover when the gripping member 1 is fixed thereto and to which the magnet 2 is fixed by a screw 7. The base 3 also comprises a central column 8 that projects substantially perpendicular to the bottom wall 6 and in which the orifice receiving the screw 7 is produced. The base 3 also comprises a peripheral wall 9 substantially cylindrical in shape and which projects substantially perpendicular to the bottom wall 6.

The bottom wall 6, the central column 8 and the peripheral wall 9 define a housing 10 for firstly the manoeuvring member 4, which is formed by a push button 4, the top wall 11 of which carries the manual control surface, and secondly the spring 5, which extends between the bottom wall 6 of the base 3 and the top wall 11 of the manoeuvring member 4. The manoeuvring member 4 is mounted so as to slide in the housing in the direction defined by the central column 8.

In addition, the manoeuvring member 4 comprises a stop member 12 (in this case a lug 12) that extends along the peripheral wall 9 of the base 3 from the top wall 11 and passes through the bottom wall 6 of the base 3 at an opening 13. The stop member 12 is sufficiently long so that its free end 14 comes into abutment against a support surface carried by the cover when the manoeuvring member 4 passes from its magnetisation position to its release position, and moves the base 3 away from the cover (and therefore the magnet 2 from the magnetisable piece) when the manoeuvring member 4 is in its release position.

Thus, in the first embodiment, the movement of the manoeuvring member 4 from one of its positions to another causes a modification of the distance separating the magnet 2 from the magnetisable piece (and therefore a modification of the intensity of the magnetic force exerted on the magnetisable piece).

As can be seen in FIGS. 2 to 6, in the second and third embodiments, the magnet 2 is carried by a stud 15 that is mounted so as to be able to move with respect to the base 3 and that is driven by the manoeuvring member 4 between a magnetisation position in which the manoeuvring member 4 is in its magnetisation position and a release position in which the force exerted by the magnet 2 on the magnetisable piece is insufficient to enable the gripping member 1 to be secured to the cover.

As in the first embodiment, the base 3 comprises a peripheral wall 9, substantially cylindrical in shape, and an internal annular shoulder 16 that extends substantially perpendicular to the revolution axis of the peripheral wall 9. In addition, the internal annular shoulder 16 comprises an opening 17.

The peripheral wall 9 and the internal annular shoulder 16 define a housing 18 for firstly the stud 15, which extends in the base 3 and passes through the internal annular shoulder 16 at the opening 17, and secondly the spring 5.

The stud 15 comprises a central column 19 that passes through the opening 17 and defines its translation direction in the base 3. The central column 19 comprises a bottom end 20 to which the magnet 2 is fixed by a screw 21 screwed into a housing carried by the central column 19. The stud 15 also comprises an external shoulder 22 that is adapted to come into abutment against the internal annular shoulder 16 when the manoeuvring member 4 is in its magnetisation position and thus to define the magnetisation position of the stud 15.

The internal annular shoulder 16 and the peripheral wall 9 of the base 3 define a first housing 23 that is situated on a first side of the internal annular shoulder 16 and in which the bottom end 20 and the magnet 2 are housed. The internal annular shoulder 16 and the peripheral wall 9 of the base 3 define a second housing 24 that is disposed on the other side of the internal annular shoulder 16 and in which the external shoulder 22 of the stud 15 is housed. In the second embodiment the spring 5 is housed in the first housing 23, extends between the magnet 2 and the internal annular shoulder 16 of the base 3 and urges the stud 15 into its magnetisation position. In the third embodiment the spring 5 is housed in the second housing 24, extends between a cover 25, which is secured to the base 3 by means of screws 26, and the top end 27 of the stud 15, and urges the stud 15 into its magnetisation position.

The stud 15 also comprises a cam surface 28 that, in the second and third embodiments, is disposed in the second housing 24 and that is adapted to cooperate with the manoeuvring member 4 connected to the base 3 so that, when the manoeuvring member 4 passes from its magnetisation position to its release position it drives the stud 15 from its magnetisation position to its release position.

In the present embodiment the manoeuvring member 4 is formed by two elements 4 that are mounted pivotally with respect to the base 3 on an axis substantially parallel to the revolution axis of the peripheral wall 9 of the base 3. Each element 4 is connected to the base 3 by a shaft 29 that defines the pivot axis and is conformed so as to come to bear against the cam surface 28. Because of this, in the aforementioned two embodiments, bringing the two elements 4 closer to each other by pivoting about their pivot axis causes the translation of the stud 15. In addition, the base 3 comprises, in its peripheral wall 9, a guide opening 30 that imposes their movements on the two elements 4 and that thereby limits the torsion forces at the shafts 29 and therefore makes it possible to effectively transmit the movement to the stud 15.

Thus, in the second and third embodiments, the movement of the manoeuvring member 4 from one of its positions to the other causes a modification of the distance separating the magnet 2 from the magnetisable piece (and therefore a modification of the intensity of the magnetic force exerted on the magnetisable piece).

In the second embodiment, each element 4 is formed by a rod 4, the shaft 29 that is associated with it being disposed in an anchoring cavity 31 produced in the peripheral wall 9 and disposed substantially opposite to the guide opening 30 with respect to the revolution axis of the base 3.

In the third embodiment, each element 4 is formed by an aileron 32 that is carried by an arc 33. The arc 33, off-centre with respect to the pivot axis of the element 4, is adapted to come into abutment against the cam surface 28 of the stud 15. In this embodiment, the shafts 29 are carried by the internal annular shoulder 16.

Figure 7:
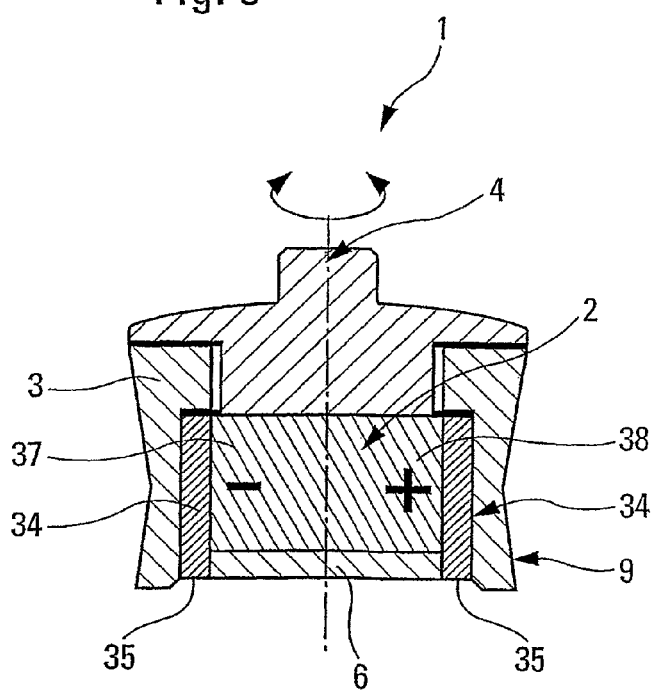
FIG. 7 is a sectional view of a gripping member according to a fourth embodiment.
Figure 8:
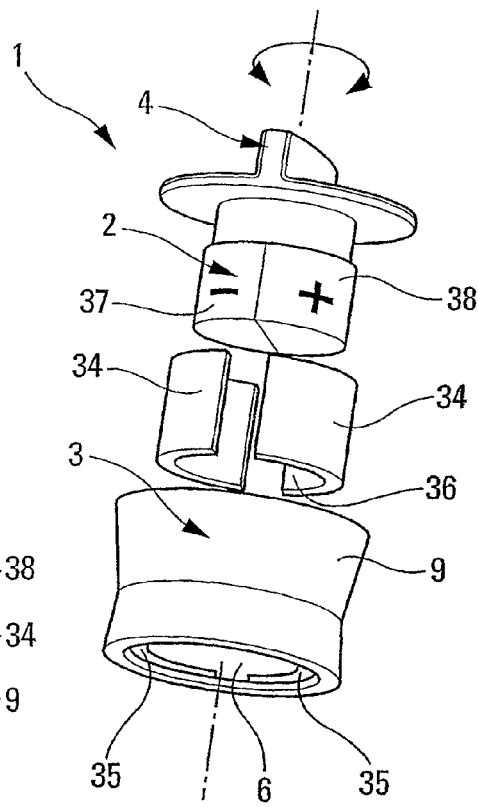
FIG. 8 is an exploded perspective view of the gripping member according to the fourth embodiment.

As can be seen in FIGS. 7 and 8, in the fourth embodiment the magnet 2 is carried by the manoeuvring member 4.

The base 3 comprises a bottom wall 6 that faces the cover when the gripping member 1 is fixed to it, and a peripheral wall 9 substantially cylindrical in shape, projecting substantially perpendicular to the bottom wall 6.

The base 3 also comprises two transmission members 34 that are made from a magnetisable material, such as soft steel. Each transmission member 34 extends along the peripheral wall 9 and passes through the bottom wall 6 at an opening 35 so as to be in contact with or in the immediate vicinity of the magnetisable piece carried by the cover. The inside of the base 3 defines a housing 36 for firstly the manoeuvring member 4, which is mounted so as to rotate therein on the revolution axis of the peripheral wall 9, and secondly the magnet 2 that is fixed to the manoeuvring member 4. The housing 36 is delimited axially by the bottom wall 6 that magnetically isolates the magnet 2 from the magnetisable piece carried by the cover. The housing 36 is delimited radially on the one hand by the two transmission members 34 and on the other hand by the two portions of the peripheral wall 9 that separate the two transmission members 34 from each other.

The magnet 2 with a cylindrical shape complementary to the shape of the housing 36 is biased so that, when the manoeuvring member 4 is in its magnetisation position, each pole 37, 38 of the magnet 2 is in contact with a single transmission member 34 so that these transmit to the magnetisable element the magnetic flux generated by the magnet 2 and, when the manoeuvring member 4 is in its release position, each pole 37, 38 of the magnet 2 is in contact with the two transmission members 34 so as to short-circuit the magnetic circuit. In the present embodiment, the manoeuvring member 4 passes from a magnetisation position to a release position and from a release position to a magnetisation position by a rotation of a quarter of a turn.

Thus, in the fourth embodiment, the movement of the manoeuvring member 4 from one of its positions to the other causes a modification to the circulation of the magnetic flux.

As can be seen in the various figures, in all the embodiments the gripping member 1 has only one magnet 2.

Many modifications can be made to the embodiments described.

Thus the magnet 2 could be carried by the cover and the magnetisable piece by the gripping member 1.

In addition, in the second embodiment, the cam surface 25, instead of being carried by the stud 15, could be carried by the base 3, the manoeuvring member 4 then being connected to the stud 15.

In the fourth embodiment, the two transmission members 31, 32, instead of each extending angularly over almost half of the cylinder, could extend over a much smaller angular sector so that, when the manoeuvring member 4 goes to its release position, each pole of the magnet 2 would be in contact with neither of the two transmission members 31, 32, which would also short-circuit the magnetic circuit.

It would also be possible for the gripping member to comprise several magnets, which would then all be completely integral with one another in terms of movement.

The invention claimed is:

1. A culinary utensil lid comprising a cover for covering the culinary utensil and a removable gripping member able to be fixed to the cover by the action of a magnet on a magnetizable piece, the said gripping member comprising a magnet, a base and a maneuvering member able to move with respect to the base between a magnetization position in which a force exerted by the magnet on the magnetizable piece makes it possible to secure the gripping member to the cover, and an isolation position in which this force is insufficient to allow the fixing of the gripping member to the cover, wherein the magnet is carried by a stud able to move with respect to the base and driven by the maneuvering member between a magnetization position in which the maneuvering member is in the magnetization position and a release position in which the force exerted by the magnet on the magnetizable piece is insufficient to enable the gripping member to be secured to the cover.

2. A culinary utensil lid according to claim 1, wherein the gripping member comprises a spring pushing the maneuvering member into said magnetization position.

3. A culinary utensil lid according to claim 1, wherein the movement of the maneuvering member from one of said positions to another of said positions causes a modification to magnetic flux circulation.

4. A culinary utensil lid according to claim 1, wherein the maneuvering member carries a stop member adapted to come into abutment against a support surface carried by the cover so that, when the maneuvering member passes from said magnetization position to a release position, putting the stop member in abutment causes the base to separate from the cover.

5. A culinary utensil lid according to claim 1, wherein a stud comprises a cam surface adapted to cooperate with the maneuvering member so that, when the maneuvering member passes from said magnetization position to a release position, the stud is driven from a stud magnetization position to a stud release position.

6. A culinary utensil lid according to claim 3, wherein the base comprises two magnetizable transmission members that are without contact with each other, and the magnet, which is magnetically isolated from the magnetizable piece, is biased and disposed in the base so that, when the maneuvering member is in said magnetization position, each pole of the magnet is in contact with a single transmission member so that a magnet flux generated by the magnet is transmitted to the magnetizable element and, when the maneuvering member is in its release position, each pole is in contact either with the two transmission members or with neither of the two transmission members.

* * * * *